(12) United States Patent
Zhang et al.

(10) Patent No.: US 12,506,541 B1
(45) Date of Patent: Dec. 23, 2025

(54) INTEGRATED TRANSCIEVER SYSTEMS AND METHODS

(71) Applicant: CABLE TELEVISION LABORATORIES, INC., Louisville, CO (US)

(72) Inventors: Haipeng Zhang, Broomfield, CO (US); Zhensheng Jia, Superior, CO (US); Mu Xu, Broomfield, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 769 days.

(21) Appl. No.: 17/860,825

(22) Filed: Jul. 8, 2022

Related U.S. Application Data

(60) Provisional application No. 63/219,690, filed on Jul. 8, 2021.

(51) Int. Cl.
*H04B 10/294* (2013.01)
*H04B 10/40* (2013.01)
*H04B 10/50* (2013.01)

(52) U.S. Cl.
CPC ........ *H04B 10/2941* (2013.01); *H04B 10/40* (2013.01); *H04B 10/5053* (2013.01); *H04B 10/506* (2013.01)

(58) Field of Classification Search
CPC  H04B 10/2941; H04B 10/40; H04B 10/5053; H04B 10/506
USPC ......................................................... 398/135
See application file for complete search history.

(56) References Cited

U.S. PATENT DOCUMENTS

| | | | |
|---|---|---|---|
| 10,763,968 B1* | 9/2020 | Li | H04B 10/40 |
| 2020/0280373 A1* | 9/2020 | Palmer | H04B 10/40 |
| 2020/0358530 A1* | 11/2020 | Olson | H04B 10/541 |
| 2021/0320723 A1* | 10/2021 | Tu | H04B 10/614 |

* cited by examiner

*Primary Examiner* — Dalzid E Singh (57) ABSTRACT

A transceiver is provided for a communication network. The transceiver includes a single laser source configured to output (i) a first optical laser signal at a first wavelength, and (ii) a second optical laser signal at a second wavelength different from the first wavelength. The transceiver further includes a coherent transmitting portion configured to modulate the first optical laser signal for transmission to the communication network, and a coherent receiving portion configured to utilize the second optical laser signal as a local oscillator source.

20 Claims, 8 Drawing Sheets

INTEGRATED TRANSCIEVER SYSTEMS AND METHODS

CROSS REFERENCE TO RELATED APPLICATIONS

This application claims the benefit of and priority to U.S. Provisional Patent Application Ser. No. 63/219,690, filed Jul. 8, 2021, the subject matter of which is incorporated herein by reference in its entirety.

BACKGROUND

The field of the disclosure relates generally to communication networks, and more particularly, to innovative bidirectional digital transport techniques over a variety of communication systems.

Recent continuous growth in data-intensive applications and services, such as high-definition video-on-demand, residential data services, cloud computing/storage, Internet of Things (IoT), "Big Data," business services, cellular connectivity, etc., has resulted in a related continuous increase in the overall traffic volume demanded and delivered across today's communication networks. To support this increasing demand, network operators are increasingly utilizing fiber and optical access technologies. For example, conventional short-distance implementations are known to deploy optical access networks utilizing intensity modulation direct detection (IM-DD) technology to mitigate the overall cost and complexity of the network in point-to-point (P2P) and passive optical network (PON) links. However, although IM-DD technology has evolved significantly over the last two decades, IM-DD-based network solutions suffer from significant limitations with respect to modulation bandwidth, transmission distances, PON split ratio, and poor receiver sensitivity.

In comparison with IM-DD-based networks, networks based on coherent technology provide superior performance, higher-sensitivity reception, larger split ratios for PONs, an inherent capability for frequency selectivity, and linear field detection enabling full linear channel impairment compensation (e.g., higher tolerances to chromatic dispersion (CD), polarization mode dispersion (PMD), etc.). Additionally, coherent technologies support exceptionally high data throughput over a longer reach deployments (e.g., greater than 50 km), and efficiently utilize spectral resources and enable future network upgrades through the use of multi-level advanced modulation formats.

The cost of conventional coherent technology systems, however, has been dominated by complex optical and optoelectronic components, such as high-performance tunable lasers and local-oscillators (LOs), high-speed modulators, digital signal processing (DSP) chips, polarization optics, etc. One barrier to reducing the cost of such coherent optical communication modules arises from the conventional need for two high-quality narrow-linewidth lasers. That is, different from conventional IM-DD communications systems, which may utilize a single laser at the transmitter side, both of the coherent optical transmitter and coherent optical receiver in a conventional coherent communication have required one laser as the respective modulator light source, and another laser as the respective LO. Moreover, since both lasers for the conventional coherent system have necessarily been high-power, wavelength-tunable, and narrow-linewidth, the additional cost of having two such lasers has made coherent deployments cost-prohibitive for a number of applications.

Furthermore, doubling the number of lasers further burdens the power supply of the respective module, while also adding extra costs to design/redesign the structure and thermal control of the module to accommodate the need for additional heat dissipation for the second laser. An additional laser may still further require a larger module footprint, thereby creating another challenge to integrate such conventional coherent modules into small form factor modules, such as the C form-factor pluggable module 4 (CFP4) and the quad small form-factor pluggable module 28 (QSFP28). Some effective cost-reducing solutions for coherent systems were introduced by the present inventors in U.S. Pat. No. 10,944,478, issued Mar. 9, 2021, which discloses several innovative techniques implementing optical injection locking (OIL)-based architectures and processes utilizing optical full-field transmitters (OFFTs). The subject matter of this previous patent is incorporated herein by reference.

In the typical conventional coherent module, however, the two separate lasers operate over two different wavelengths, respectively. In conventional bidirectional communication systems utilizing a two-laser coherent module, the two different wavelengths are transmitted either (1) separately over two different fibers, e.g., dedicated to downlink and uplink transmissions, respectively, or (2) over the same fiber, e.g., a single-mode fiber (SMF). In the first approach, the two different wavelengths are immune from reflections and crosstalk, however, the requirement of two separate fibers for bidirectional communication greatly increases the cost of physical fiber deployment.

In the second, single-fiber, approach, wavelength diplexers are conventionally used to combine/split the two wavelengths used for the respective downstream and upstream signals. In a conventional P2P link, this approach requires only a single fiber connection between an optical line terminal (OLT) and an associated optical network unit (ONU), and generally only experiences a slightly increased link penalty from the wavelength diplexers. Similarly, in a point-to-multipoint (P2MP) architecture, only a single fiber connection is required to the node or splitter that is in communication with a plurality of ONUs. This approach has become a more cost-effective solution as the fabrication technology of photonic chips has recently advanced. For example, integrated wavelength diplexers over a III-V photonic integrated circuit (PIC) or silicon photonics are being deployed in relatively low-cost hardware such that the single-fiber approach is becoming more and more favorable in the industry than conventional dual fiber connections. As described further below with respect to FIGS. 1A-2, these considerations are even more significant with respect to the full-duplex (FDX) coherent optics (FDCO) paradigm.

Figure 1A:
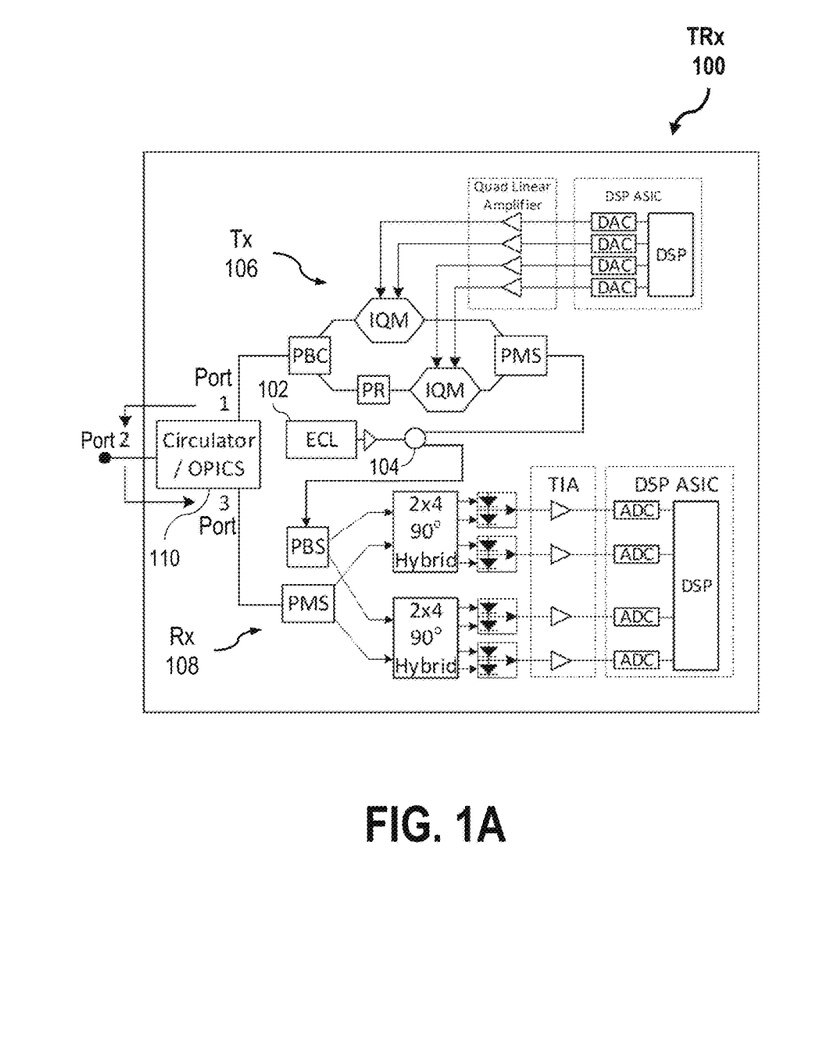
FIG. 1A is a schematic illustration of a conventional coherent optical transceiver module.
Figure 1B:
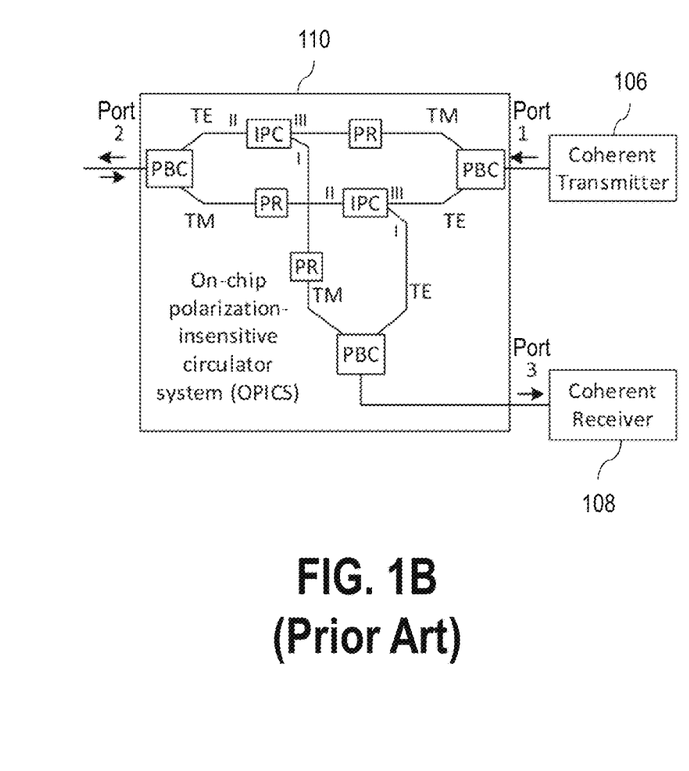
FIG. 1B is a schematic illustration of the optical circulator depicted in FIG. 1A.

FIG. 1A is a schematic illustration of a conventional coherent optical transceiver module 100. In this example, module 100 depicts a simplified schematic architecture for an FDCO module, which may, for example, be configured according to several embodiments introduced by the present inventors in U.S. Pat. No. 10,917,175, issued Feb. 9, 2021, the subject matter of which is also incorporated herein by reference in its entirety. In an exemplary embodiment, conventional module 100 includes a single primary laser source 102 (an external cavity laser (ECL), in this example), which, at an optical coupler 104 is separately routed to respective inputs of each of a coherent transmitting portion 106 and a coherent receiving portion 108. ECL 102 may include an amplifier (not separately numbered) disposed between laser source 102 and optical coupler 104.

In the example depicted in FIG. 1A, coherent transmitting portion 106 is configured as a dual-polarization I/Q modulator (IQM) in communication with a quad linear amplifier and a transmitter application specific integrated circuit (ASIC) processor configured to perform digital-to-analog conversion (DAC) and digital signal processing (DSP). The I/Q modulator of the transmitting portion 106 is further shown to include additional components, such as a transmitter polarization beam coupler (PBC), a polarization rotator (PR), and a transmitter beam splitter (i.e., a polarization maintaining splitter (PMS), in this example) in communication with optical coupler 104.

Similarly, coherent receiving portion 108 is also configured for dual-polarization I/Q processing in the conventional manner, and includes a receiver ASIC processor configured to perform analog-to-digital conversion (ADC) and digital signal processing (DSP). In the example shown in FIG. 1A, receiver ASIC is configured to receive four input analog signals (e.g., XI, XQ, YI, YQ) from a plurality of transimpedance amplifiers (TIAs) following respective outputs of two optical hybrids (i.e., 2×4 90-degree hybrids, e.g., for X- and Y-polarization signals, respectively), which in turn receive optical signals from each of a receiver polarization beam splitter (PBS) in communication with optical coupler 104, and a receiver PMS.

Module 100 further includes a three-port optical circulator 110, with Port 1 in communication with the transmitter PBC, Port 2 in communication with the output fiber (not shown), and Port 3 in communication with the receiver PMS. Optical circulator 110 operates by allowing communication therethrough only following the direction from Port 1 to Port 2, and from Port 2 to Port 3. Other optical routes within optical circulator 110 are blocked. Accordingly, through optical circulator 110, output light from the modulator of coherent transmitting portion 106 is guided to the output fiber (i.e., from Port 1 to Port 2), and the input light from the optical fiber is directed to coherent receiving portion 108 (e.g., from Port 2 to Port 3). Thus, through these two coexisting optical paths, FDX transmission over a single fiber is realized.

However, the utilization of conventional optical circulators has created significant challenges to existing optical FDX systems. The most commonly used conventional circulator, for example, is composed of two birefringent crystals, a Faraday rotator, and at least one PBS/PBC. The necessary lanes, prisms, and plates of such conventional devices require a free-space optical system having a large physical footprint that is difficult to integrate the relatively small footprint of photonic chips. Furthermore, the back reflection and thermal stability of conventional fiber circulators often do not meet PON specification requirements. Although it is possible to enhance the isolation and thermal stability of conventional circulators, these enhancements result in increases in both the cost and the size of the device, thereby rendering integration into photonic chips even more difficult.

One recent solution to these conventional optical circulator challenges proposes substituting the common optical circulators of optical circulator 100 with an integrated photonic circulator (IPC) over programmable logic circuit/controller (PLC) or silicon photonic chip, such as an on-chip polarization-insensitive circulator (OPIC) system (OPICS). A conceptual OPICS architecture for optical circulator 110 is described further below with respect to FIG. 1B.

FIG. 1B is a schematic illustration of optical circulator 110, FIG. 1A. As depicted in FIG. 1B, optical circulator 110 is configured as an OPIC system. OPIC systems differ from commonly-used integrated photonic circulators, in that the commonly-used circulators are polarization-sensitive devices, operate only for either of a transverse electric (TE)- or a transverse magnetic (TM)-polarized mode. OPIC systems operate to break such polarization dependency by separating the TE and TM light in the on-chip circulator through a circulator PBC at each input/port of the device for independent processing.

For example, looking only at the TE-polarized mode, light is directly fed into the IPC for the TE branch. The IPC then circulates the light following the sequence (i) from Port 1 to Port 2, and then (ii) from Port 2 to Port 3. In contrast, for the TM branch, a PR functions to rotate the TM mode into the TE mode before the light is fed into IPC. In this example, overall insertion losses of the TE and TM branches are matched to avoid polarization-dependent loss (PDL). The other two circulator PBCs also function to separate and combine the TE and TM light at Port 1 and Port 3, respectively.

Nevertheless, OPIC systems are still under study, and the architectural configuration of FIG. 1B remains primarily theoretical. OPICS have not been implemented into existing commercial products due to such challenges as: (1) many polarization control devices require strict precision control to eliminate PDL; (2) OPICS insertion loss is significantly high relative to existing commercial products; and (3) the theoretical OPICS architecture presents a considerable number of potential back reflection points at the waveguide junctions, thereby weakening the isolation thereof. Accordingly, the high-complexity and low-reliability of OPICS does not, at present, represent a qualified solution to achieve an FDX photonic chip.

Figure 2:
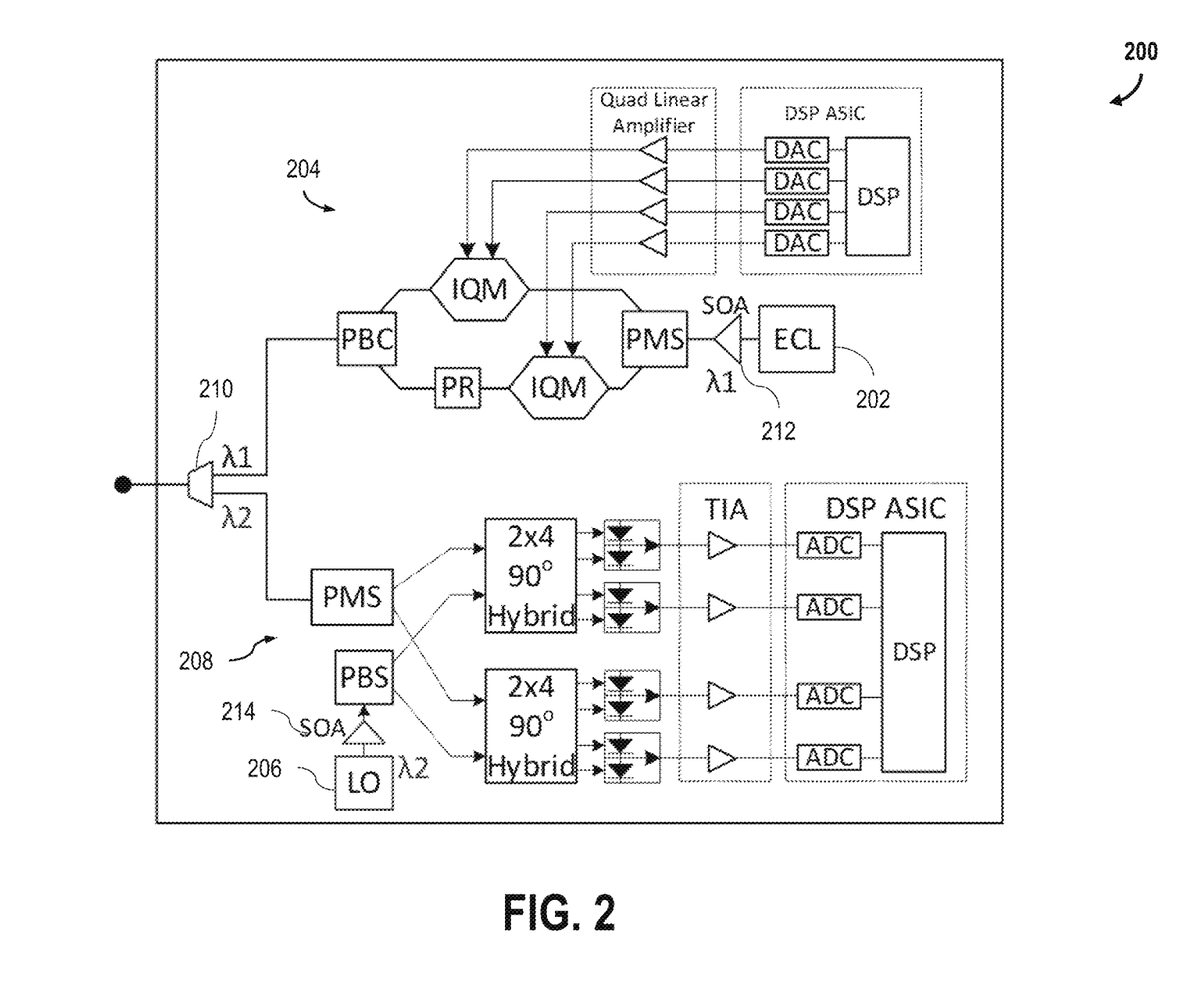
FIG. 2 is a schematic illustration of an alternative conventional coherent optical transceiver module.

FIG. 2 is a schematic illustration of an alternative conventional coherent optical transceiver module 200. Module 200, in general structure and functionality, is similar to module 100, FIG. 1A, except that module 200 represents a conventional two-laser solution, namely, an architectural configuration based on two independent laser sources (i.e., ECLs, in this example) having different respective wavelengths λ1, λ2. More specifically, module 200 includes (i) a transmitter laser 202 emitting a narrow linewidth light centered at wavelength λ1 for a coherent transmitting portion 204 (i.e., into the transmitter PMS thereof), and (ii) a receiving laser 206 emitting a narrow linewidth light centered at wavelength λ2 for a coherent receiving portion 208 (i.e., into the receiver PBS thereof). In this example, receiving laser 206 functions to produce the LO signal.

Module 200 is otherwise substantially comparable to module 100, FIG. 1A, and includes substantially the same component architecture and functionality, except that the use of two lasers eliminates the need for an optical circulator (e.g., optical circulator 110, FIGS. 1A-B) to restrict the light paths from and to coherent transmitting portion 204 and coherent receiving portion 208. Instead, a single diplexer 210 is implemented to separate and combine the different wavelengths λ1, λ2 from the transmitter PBC and to the receiver PMS, respectively. Module 200 further includes a first semiconductor optical amplifier (SOA) 212 disposed at the output of transmitter laser 202 and a second SOA disposed at the output of receiver laser/LO 206. This two-laser solution overcomes the optical circulator challenges described above, and may be achieved for a significantly smaller physical footprint on a photonic chip. However, as described above, the cost of the additional laser for this two-laser solution renders coherent modules according to FIG. 2 prohibitively expensive.

Accordingly, there is a desire in the industry for coherent modules that realize the cost-effectiveness of single-laser solutions, but also achieve the isolation, back reflection, and smaller footprint advantages of the two-laser solutions.

SUMMARY

In an embodiment, a transceiver is provided for a communication network. The transceiver includes a single laser source configured to output (i) a first optical laser signal at a first wavelength, and (ii) a second optical laser signal at a second wavelength different from the first wavelength. The transceiver further includes a coherent transmitting portion configured to modulate the first optical laser signal for transmission to the communication network, and a coherent receiving portion configured to utilize the second optical laser signal as a local oscillator source.

BRIEF DESCRIPTION

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object-oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic circuit/controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and nonremovable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the times of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, unless specified to the contrary, "modem termination system," or "MTS'" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "coherent transceiver," unless specified otherwise, refers to a P2P or P2MP coherent optics transceiver having a coherent optics transmitting portion and a coherent optics receiving portion. In some instances, the coherent transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The person of ordinary skill in the art will understand that the term "wireless," as used herein in the context of optical transmission and communications, including free space optics (FSO), generally refers to the absence of a substantially physical transport medium, such as a wired transport, a coaxial cable, or an optical fiber or fiber optic cable.

As used herein, the term "data center" generally refers to a facility or dedicated physical location used for housing electronic equipment and/or computer systems and associated components, e.g., for communications, data storage, etc. A data center may include numerous redundant or backup components within the infrastructure thereof to provide power, communication, control, and/or security to the multiple components and/or subsystems contained therein. A physical data center may be located within a single housing facility, or may be distributed among a plurality of co-located or interconnected facilities. A 'virtual data center' is a non-tangible abstraction of a physical data center in a software-defined environment, such as software-defined networking (SDN) or software-defined storage (SDS), typically operated using at least one physical server utilizing a hypervisor. A data center may include as many as thousands of physical servers connected by a high-speed network.

As used herein, the term "hyperscale" refers to a computing environment or infrastructure including multiple computing nodes, and having the capability to scale appropriately as increased demand is added to the system, i.e., seamlessly provision infrastructure components and/or add computational, networking, and storage resources to a given node or set of nodes. A hyperscale system, or "hyperscaler" may include hundreds of data centers or more, and may include distributed storage systems. A hyperscale system may utilize redundancy-based protection and/or erasure coding, and may be typically configured to increase background load proportional to an increase in cluster size. A hyperscale node may be a physical node or a virtual node, and multiple virtual nodes may be located on the same physical host. Hyperscale management may be hierarchical, and thus the "distance" between nodes may be physical or perceptual. A hyperscale datacenter may include several performance optimized datacenters (PODs), and each POD may include multiple racks and hundreds and thousands of computing and/or storage devices.

Several embodiments are described herein with respect to various components that may be found in conventional cable, wireless/Wi-Fi, and/or optical networks, which may include, without limitation, an ONT or OLT, and an ONU, and may utilize optical protocols such as Data Over Cable Service Interface Specification (DOCSIS), Ethernet PON (EPON), Radio Frequency over Glass (RFOG), Gigabit PON (GPON), and/or Satellite Internet Protocol, without departing from the scope of the embodiments herein.

Communication systems according to the present embodiments may be further configured for X-hauling traffic, satellite operator communications, MIMO communications, microwave communications, and both short- and long-haul coherent optical communications. As used herein, the terms "xHaul" or "X-hauling" refers to any one, or a combination, of front-hauling, back-hauling, and mid-hauling.

The embodiments described herein provide innovative systems and methods for providing at least two high-quality, narrow-linewidth laser sources at different wavelengths from a single laser. The resulting dual-wavelength (DW) laser is particularly useful with respect to coherent optical communication in the FDX network paradigm, and also for optical communication systems in general, and in particular those communication systems utilizing small-footprint coherent optics transceiver modules or FDCO modules.

In an exemplary embodiment, the present systems and methods leverage coherent optics technologies to provide a single DW laser onto an integrated coherent optics transceiver module architecture. In other embodiments, the principles herein may further enable the operation of a multiple-wavelength (MW) laser producing more than two high-quality narrow-linewidth signals in a single-laser module construction.

In an exemplary embodiment, an innovative integrated optical filter is introduced, which enhances and improves the precision and effectiveness of existing laser sources utilized in optical communication systems, FDCO, and coherent optical transceiver modules. This new optical filter may, for example, be implemented in a complementary fashion to build upon the previous achievements by the present inventors, and additionally target new on-chip module designs for the advance coherent transceiver architectures, systems, and methods incorporated by reference herein from U.S. Pat. No. 10,944,478.

The innovative principles described herein are also broadly applicable to access networks, PONs, data centers, and coherent optics systems operating at various transmission speeds. The present embodiments are further fully adaptable to future-network bidirectional and/or FDX coherent architectures, as well as future-network transmission speeds and operating parameters as the demand for increased speed and bandwidth continues to grow. The following examples may also be implemented with respect to FSO or fiber links of various lengths, e.g., 50 km, 80 km, 120 km, or greater in some circumstances.

Figure 3:
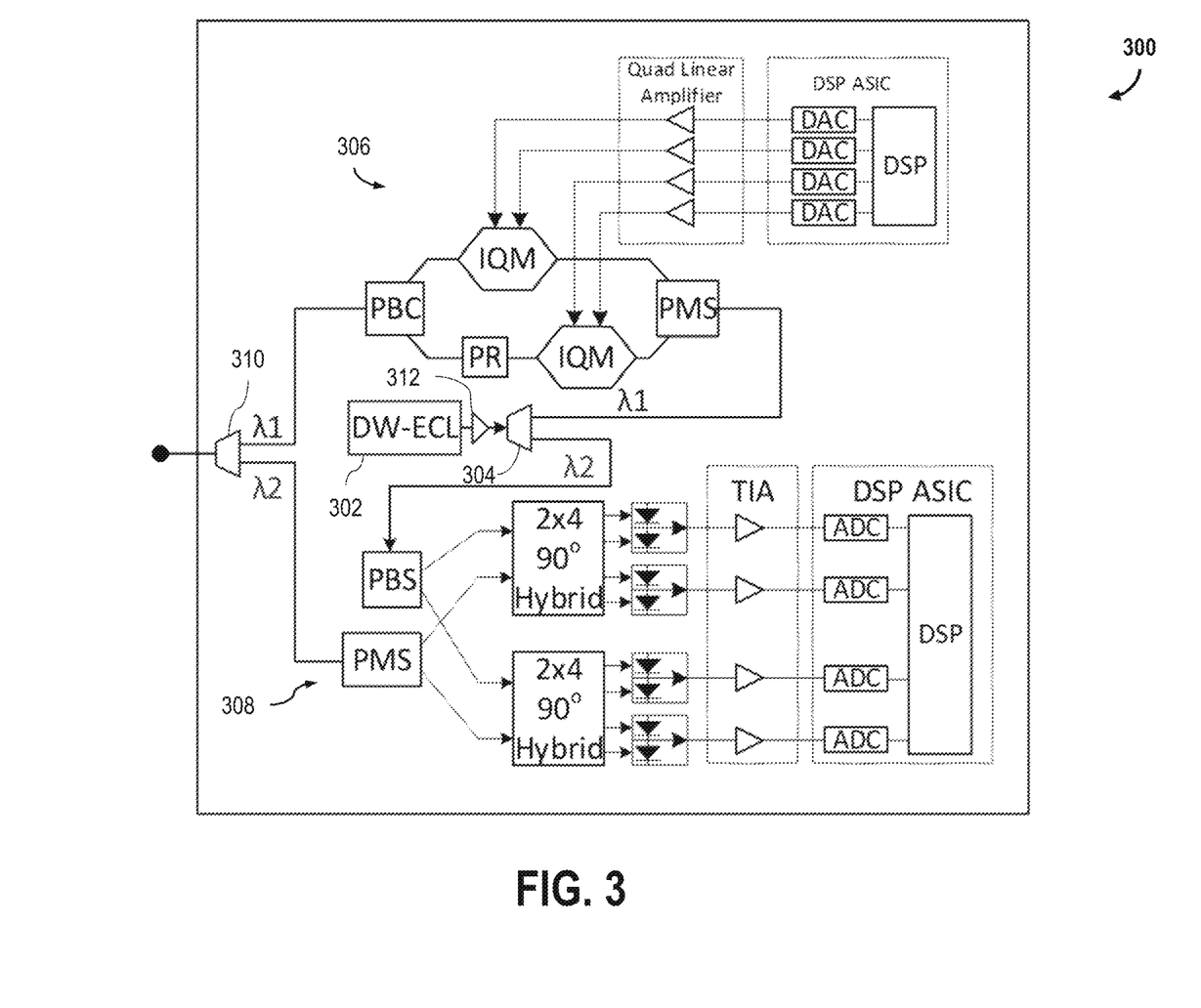
FIG. 3 is a schematic illustration of an exemplary coherent optical module architecture, in accordance with an embodiment.

FIG. 3 is a schematic illustration of an exemplary coherent optical module architecture 300. In an exemplary embodiment, module 300 is substantially similar to module 200, FIG. 2, in overall structure and functionality, except that module 300 utilizes a single DW laser source 302 (e.g., an ECL, in this embodiment) to generate two different respective wavelengths $\lambda 1$, $\lambda 2$, followed by a first waveguide diplexer 304, instead of the two independent lasers (e.g., transmitter laser 202, receiver laser 206, FIG. 2) of the conventional solution.

More particularly, at first waveguide diplexer 304, the wavelengths are split such that wavelength $\lambda 1$ is routed to a coherent transmitting sub-system 306 (e.g., into the transmitter PMS thereof), and wavelength $\lambda 2$ is routed a coherent receiving sub-system 308 (e.g., into the receiver PBS thereof). Similar to module 200, FIG. 2, wavelengths $\lambda 1$, $\lambda 2$ are separated and combined from the transmitter PBC, and to the receiver PMS, respectively, by a second diplexer 310. Accordingly, a configuration according to module 300 advantageously eliminates the need for a second independent laser source/ECL to produce the LO signal (e.g., to the receiver PBS of coherent receiving sub-system 308). In an exemplary embodiment, an SOA 312 is disposed at the output of DW laser source 302, in between laser source 302 and first waveguide diplexer 304.

Therefore, the innovative architecture of integrated transceiver module 300 advantageously reduces the number of lasers required to generate two separate wavelengths and thus, the overall cost of the module, but without significant modifications to the respective transmitter and receiver sub-systems conventionally produced. Architectural configurations according to integrated coherent transceiver module 300 achieve the advantageous results of conventional two-laser module 200, FIG. 2, but at an overall cost of the device that is more commensurate with conventional single-laser module 100, FIG. 1A. The most significant cost-savings arise from substituting the two ECLs (i.e., transmitter laser 202 and receiver laser 206, FIG. 2) of the two-laser solution with a single DW-ECL (e.g., DW laser source 302). Module 300 realizes still further cost savings by removing one of the two SOAs (i.e., first and second SOAs 212, 214) used in the conventional two-laser solution, and using instead a single SOA (e.g., SOA 312) following the single DW-ECL.

The innovative configuration of integrated coherent transceiver module 300 realizes still further cost savings from the capability to significantly simplify the driver and thermal control systems, as described further below with respect to FIGS. 4-8. Although module 300 does introduce one more wavelength diplexer (e.g., first wavelength diplexer 304) than the conventional two-laser solution of module 200, a wavelength diplexer is known to be a reliable and low-cost passive optical device (i.e., substantially lower-cost than an ECL) that may be easily integrated into PIC or silicon photonics with a considerably smaller footprint than a conventional optical circulator. Thus, as depicted in the exemplary embodiment illustrated in FIG. 3, first wavelength diplexer 304 is introduced at the output port of DW-ECL 302 and separates the two wavelengths $\lambda 1$ and $\lambda 2$ to coherent transmitter and receiver sub-systems 306 and 308, respectively.

The person of ordinary skill in the art will understand, after reading and comprehending the present application, that the particular structural configurations of coherent transmitter and receiver sub-systems 306, 308 are provided by way of example, and not in a limiting sense. The innovative exemplary embodiment depicted in FIG. 3 is of particular use in explaining the differences with, and advantages over, the conventional single- and dual-laser solutions described above with respect to FIGS. 1A-2. Further exemplary structural and functional configurations of coherent optical receivers are described in detail in co-pending U.S. patent application Ser. No. 16/370,873, filed Mar. 29, 2019, the subject matter of which is also incorporated herein by reference in its entirety.

The person of ordinary skill in the art will understand that the utility of the DW and MW laser embodiments described herein are not limited to coherent optical communication systems, FDCO modules, and/or FDX networks. The systems and methods of the present embodiments are advantageous to a variety of conventional applications where multiple lasers are used to produce two or more separate wavelengths. Additionally, the present embodiments are further described with respect to coherent transceiver modules implemented on PIC or silicon photonics chips; the person of ordinary skill in the art will further understand that this description is also by way of example, and not intended to be limiting. The DW and MW laser techniques herein are generally applicable and advantageous to optical transceivers and communication systems in general, including PONs and IM-DD-based optical networks.

Nevertheless, as described above, the desire in the industry is rapidly trending toward more inexpensive, lower-footprint on-chip transceiver module designs. A key problem confronted and solved by the present inventors is how to design an efficient and cost-effective DW laser/DW-ECL on-chip. The following embodiments are described by way of example, and not in a limiting sense, with respect to an ECL as the laser source. The person of ordinary skill in the art will understand that the principles described herein are applicable to and beneficial for other types of laser sources.

With respect to the ECL specifically, the ECL is a laser having an extra cavity structure outside the gain chip, which extra cavity functions to further purify the color of the laser light with a narrower linewidth. The ECL is particularly preferred in coherent optical systems as a useful component to provide a low-phase-noise light source. The external cavity outside the gain region of the ECL further provides capability to select and filter longitudinal modes of the output light. Many conventional ECLs are built upon an FSO system set that typically includes a reflection mirror, etalon filters, and a focusing lens. This set of FSO components require strict alignment and calibration to guarantee performance of the ECL.

Recently fabrication resolution and precision improvements in silicon photonics have provided a silicon micro-ring resonator (MRR) based on optical tunable filters. In the following embodiments, the present inventors demonstrate novel techniques for substituting one or more silicon MRR-based filters for the conventional FSO system set of an ECL, for use as a significantly enhanced mode selector of the ECL. In an exemplary embodiment, the MRR-based filter may be configured as a hybrid ECL integrated with a type III-V gain chip, coupled with planar waveguides, to form an innovative DW- or MW-ECL on-chip. This innovative configuration advantageously eliminates the need for such extra alignment procedures required for the conventional FSO system set ECL. Moreover, because silicon photonics are compatible with matured complementary metal-oxide-semiconductor (CMOS) technology, integrated on-chip architectures according to the present embodiments provide particularly promising solutions for cost-effective and large-scale fabrication using a commercial silicon chip foundry. An exemplary MRR-based filter is described below with respect to FIG. 4.

Figure 4:
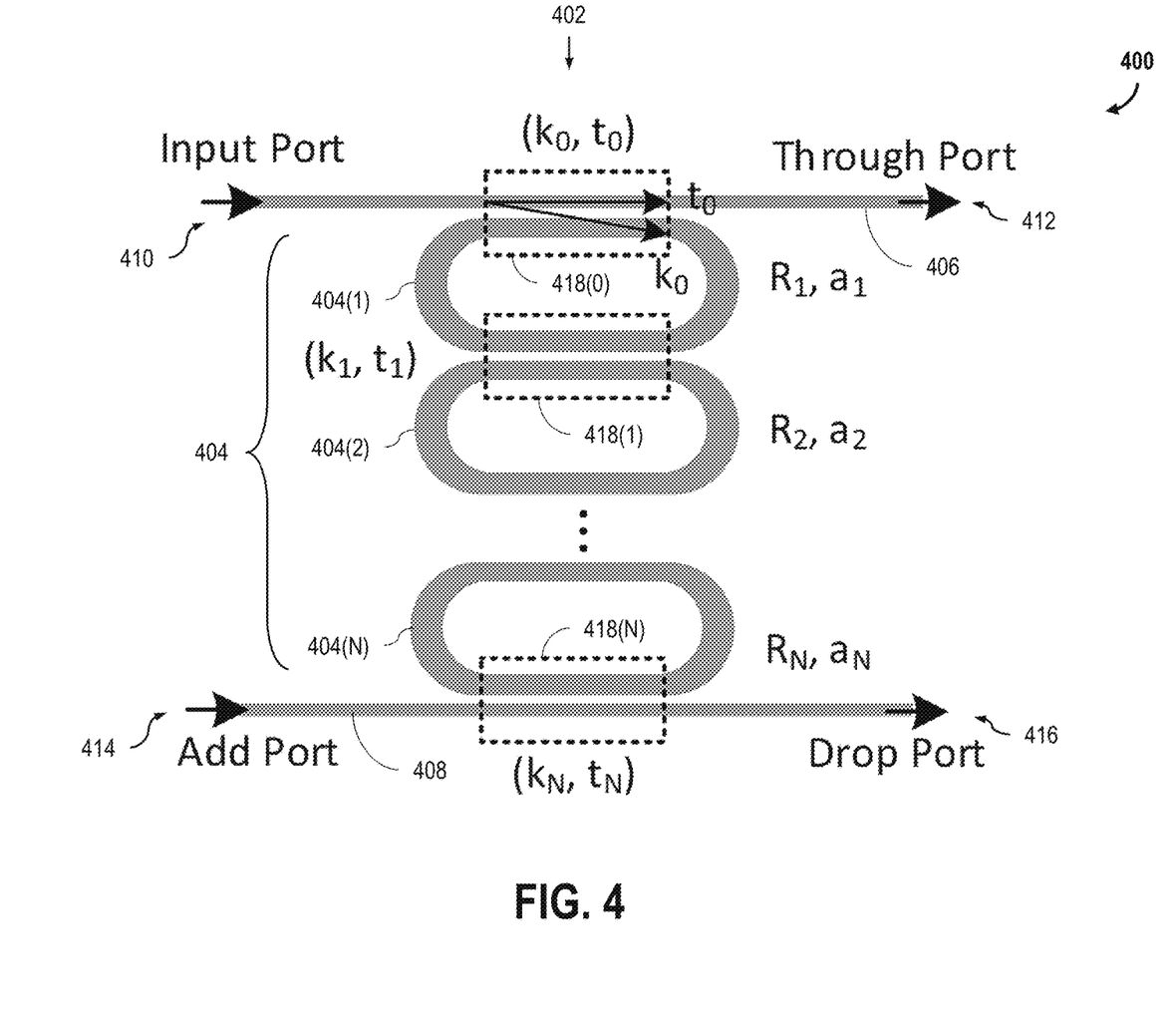
FIG. 4 is a schematic illustration of an exemplary integrated optical filter architecture, in accordance with an embodiment.

FIG. 4 is a schematic illustration of an exemplary architecture 400 for an integrated optical filter 402. In an exemplary embodiment, architecture 400 is based on a plurality (i.e., 1-N) of cascaded silicon MRRs 404 as a mode-selection filtering mechanism for an ECL (described further below with respect to FIGS. 6A-8).

In an exemplary embodiment, architecture 400 of filter 402 includes a series of 1-N cascaded MRRs 404 (e.g., Ring 404(1) through Ring 404(N)) sandwiched between (i) a first silicon waveguide 406, and (ii) a second silicon waveguide 408 disposed parallel to first silicon waveguide 406. In the exemplary embodiment depicted in FIG. 4, first silicon waveguide 406 includes an input port 410 and a through port 412, and second silicon waveguide 408 includes an add port 414 and a drop port 416. Architecture further includes a plurality (N+1, or 0-N) of coupling regions 418 (represented by dotted black boxes in FIG. 4) between a respective waveguide 406, 408 and a nearest MRR 404, or between two adjacent MRRs 404.

For each coupling region 408 between the two parallel waveguides 406, 408, the coefficient of the light passing through the same waveguide 406 or 408 may be expressed as $k_i$(i=0, 1, 2, . . . , N), whereas the coefficient of the light coupling from one waveguide towards the other waveguide may be expressed as $t_i$(i=0, 1, 2, . . . , N). According to these expressions, each $k_i$ and $t_i$ pair will follow the relationship:

$$k_i^2 + t_i^2 = 1. \quad \text{(Eq. 1)}$$

Additionally, each MRR 404 will have its own respective radius $R_j$ and attenuation coefficient $a_i$, where i=1, 2, . . . , N, excluding the case where i=0 (i.e., a "pre-ring" condition reserved to describing coupling region 418(0) between first waveguide 406 and first MRR 404(1)). Thus, given an effective refractive index $n_{eff}$ of the MRR waveguide, and for a central wavelength $\lambda$ of light through that respective waveguide, a one-round phase shift $\theta_i$ inside a particular MRR/ring 404 may be calculated as:

$$\theta_i = 2\pi n_{eff} \cdot \frac{2\pi R_i}{\lambda}. \quad \text{(Eq. 2)}$$

Accordingly, in the case where light enters into input port 410, using a transfer matrix process, the respective transmission spectral responses at through port 412 and drop port 416 may be found according to:

$$E_{through\ port} = -\frac{A}{B}, E_{drop\ port} = C - \frac{A \cdot D}{B}, \quad \text{(Eq. 3)}$$

$$\begin{bmatrix} A & B \\ C & D \end{bmatrix} = X_N \cdot Y_N \cdot X_{N-1} \cdot Y_{N-1} \cdot \ldots \cdot X_1 \cdot Y_1 \cdot X_0,$$

$$X_i = \frac{1}{jk_i} \cdot \begin{bmatrix} -t_i & 1 \\ -1 & t_i \end{bmatrix}, i = 0, 1, 2, \ldots, N,$$

$$Y_i = \begin{bmatrix} 0 & a_i^{1/2} e^{j\theta_i/2} \\ a_i^{-1/2} e^{-j\theta_i/2} & 0 \end{bmatrix}, i = 0, 1, 2, \ldots, N.$$

Exemplary results of the actual transmission spectral response, obtained at drop port 416 according to Eqs. 1-3, above, are described further below with respect to FIG. 5.

Figure 5:
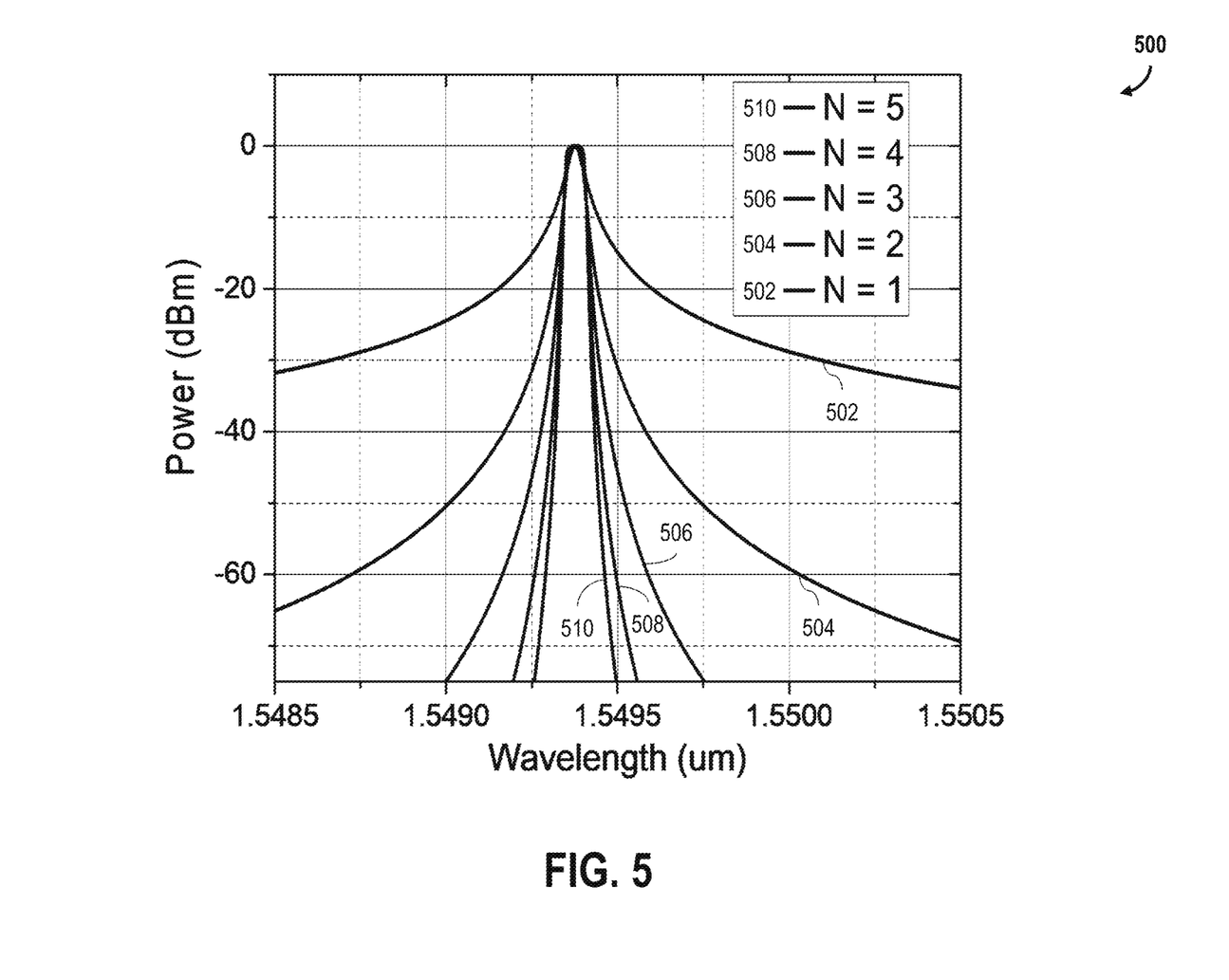
FIG. 5 is a graphical illustration depicting a comparative plot of filtering responses of the integrated optical filter architecture depicted in FIG. 4.

FIG. 5 is a graphical illustration depicting a comparative plot 500 of filtering responses 502, 504, 506, 508, 510 of integrated optical filter architecture 400, FIG. 4. More particularly, plot 500 illustrates the measured results of wavelength (in µm) plotted against optical power (in dBm) obtained through an implementation of optical filter architecture 400 (i.e., measured at drop port 416). In this embodiment, plot 500 compares the filtering response results for a variety of iterations of optical filter architecture 400 employing a different number N of cascaded silicon MRRs/rings 404. That is, filtering response 502 corresponds to an implementation of optical filter architecture 400 employing a single MRR/ring 404 between parallel waveguides 406, 408, i.e., N=1. Thus, filtering response 504 corresponds to optical filter architecture 400 cascading two MRRs/rings 404, i.e., N=2, and filtering responses 506, 508, 510 similarly correspond to values of N=3, N=4, N=5, respectively, for the particular iteration of optical filter architecture 400.

For the results graphically depicted in comparative plot 500, a cascaded MRR filtering network was implemented having parameter values (e.g., Eqs. 1-3, above) of $a_{1-5}$=0.999, $k_0$=0.1, $k_{1-5}$=0.005, $R_{1-5}$=4.65 µm, $n_{eff}$=3.5. Filtering responses 502-510 thus illustrate the measured transmission spectral response at drop port 416 for a different number of cascaded MRRs 404, i.e., 1-5 MRRs 404, respectively. As may be seen from the results of comparative plot 500, as the number of cascaded MRRs increases, both the "sharpness" of the filtering window and the "flatness" at the top of the response are significantly enhanced. That is, in comparison with filtering response 502 (i.e., N=1), filtering response 510 (i.e., N=5) exhibits a significantly narrower filtering window with a considerably flatter top.

Furthermore, the extinction ratio also successively improves as the number of cascaded rings increases. Accordingly, these improved sharpness and extinction ratio effects render embodiments based on architecture 400, FIG. 4, particularly valuable for use as a mode selector inside an ECL, as described further below with respect to FIGS. 6A-8), due to the capability to further improve the carrier to noise ratio (CNR) and suppress undesired longitudinal modes outside of the filtering window.

Figures 6A, 6B:
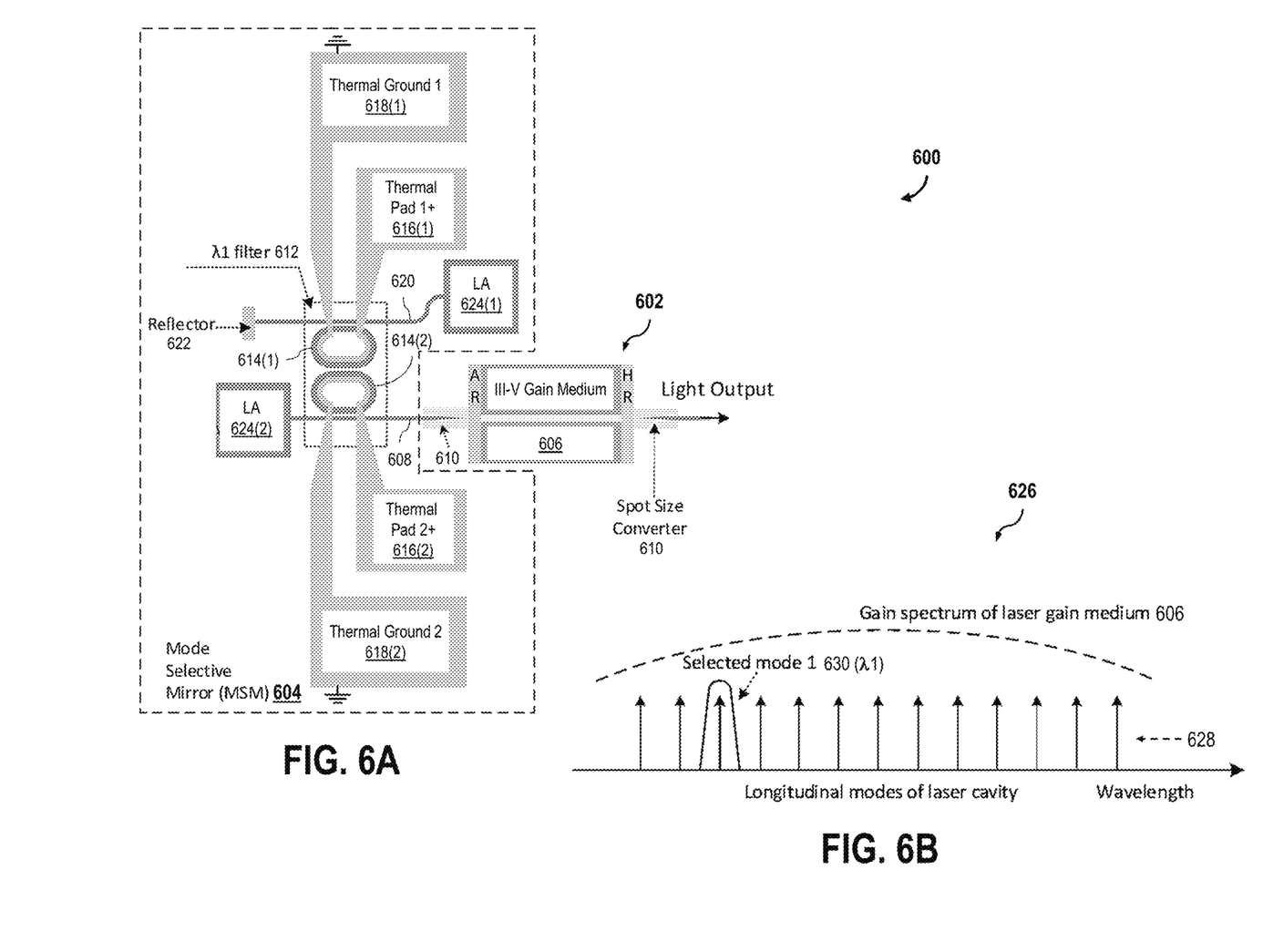
FIG. 6A depicts an exemplary single-wavelength laser architecture, in accordance with an embodiment.
FIG. 6B depicts an exemplary operational principle of the single-wavelength laser architecture depicted in FIG. 6A.

FIG. 6A depicts an exemplary single-wavelength laser architecture 600. In the exemplary embodiment depicted in FIG. 6A, laser 602 architecture 600 is illustrated in a single-wavelength silicon hybrid ECL configuration that integrates a laser 602 (e.g., an ECL) with a wavelength-selective optical mode selective mirror (MSM) 604 (dashed outline in FIG. 6A) employing the MRR-based optical filtering techniques described above with respect to FIG. 4. For ease of explanation, MSM 604 is described with respect to selection of a single-wavelength to demonstrate the integration of this innovative MSM construction (e.g., MSM 604) with an ECL (e.g., laser 602).

In an embodiment, laser 602 includes a gain medium region 606 in the laser cavity thereof. Gain medium region 606 may, for example, be constructed from III-V semiconductors, including but not limited to one or more of InP, InGaAs, and InGaAsP with layered quantum well structure. The remaining structural configuration of laser 602 may conform to that of a conventional ECL having (i) a rear facet with an anti-reflection (AR) coating to reduce the undesired back reflections between the III-V portion and a first silicon waveguide 608 coupled therewith (e.g., at a drop port, described above), and (ii) a front facet with a layer of high-reflection (HR) coating to reflect part of the optical light back into the cavity to facilitate light oscillation therein. In an embodiment, a spot size converter (SSC) 610 may be disposed at one or both of the front and rear facets as a transition region for optical mode conversion, for example, from first silicon waveguide 608 into the III-V semiconductor of gain medium region 606.

In the exemplary embodiment of architecture 600 depicted in FIG. 6A, first silicon waveguide 608 may further couple with MSM 604 at an end (e.g., an add port) of first silicon waveguide 608 opposing the rear facet of laser/ECL 602. In the exemplary embodiment, MSM 604 has a silicon photonics-based configuration that enables a simplified integration with first silicon waveguide 608. MSM 604 includes a photonic filter 612 (dotted box in FIG. 6A) having one or more silicon-based MRRs 614. In the exemplary embodiment depicted in FIG. 6A, photonic filter 612 includes two cascaded (i.e., in a direction perpendicular to first silicon waveguide 608) silicon MRRs 614, that is, N=2 in relation to the embodiments described above with respect to FIGS. 4-5. Each MRR 614 may further include a respective thermal pad 616 having a respective thermal ground 618, which enable temperature control of the respective MRR 614 to adjust the effective refractive index thereof. In this manner, round-trip phase inside the respective MRR 614 may be changed to shift the oscillating wavelength and filtering window as desired for a selected wavelength ($\lambda 1$, in this example).

In an exemplary embodiment, MSM 604 includes a second silicon waveguide 620 parallel to first silicon waveguide 608 opposite MRR(s) 614. In some embodiments, second silicon waveguide 620 may further include an optical reflector 622 at an end (e.g., an input port) of second silicon waveguide 620 opposite laser 602. Optical reflector 622 may, for example, be formed of metal (e.g., copper, silver, etc.) having a reflection coefficient approaching 1. In an embodiment, remaining ends (e.g., through port and add port) of first and second silicon waveguides 620, 608 may be terminated with respective first and second light absorbers 624, which function to prevent light from leaking out of the cavity of laser 602.

The person of ordinary skill in the art will understand that architecture 600 and photonic filter 612, by way of example and not in a limiting sense, are illustrated in FIG. 6A as having two cascaded MRRs 614. As described above with respect to FIGS. 4-5, the number N of MRRs 614 may be increased (or reduced) to achieve improved sharpness and extinction ratio of the filtering window. Cascading additional MRRs though, may require a tradeoff between these improved performance results, on the one hand, and the implementation of additional or more complex thermal control pads (e.g., thermal pads 616) which may require a larger footprint. Nevertheless, the innovative MSM and photonic filter design of present embodiments enables the fabricator significant versatility to optimize the number of cascaded MRRs (and/or photonic filters, described below with respect to FIGS. 7A-8) according to the particular desired operational parameters and manufacturing tolerances.

FIG. 6B depicts an exemplary operational principle 626 of single-wavelength laser architecture 600, FIG. 6A. In an exemplary embodiment, the HR coating at the front facet of laser 602 and the metal of optical reflector 622 function to form a pair of reflective mirrors for the laser cavity, which produce a series of longitudinal modes 628 inside the cavity, as illustrated in FIG. 6B. Without the mode selective function provided by MSM 604 and photonic filter 612, laser 602 essentially functions as a simple Fabry Perot (FP) laser having a number of longitudinal modes equally spaced in frequency. In contrast, by integrating MSM 604 and its photonic filter 612 with laser 602, the MRR-based photonic filter is enabled to advantageously select one particular mode 630 out of the series of equally spaced longitudinal modes 628. That is, integration of an MRR-based optical filter according to the present embodiments, enables the selection for amplification and oscillation by laser 602 of only the particular mode 630 corresponding to the filtering window of photonic filter 612. All other longitudinal modes 628 will be suppressed. Additionally, as the quality of the MRR-based photonic filter 612 increases, the linewidth of the selected particular mode 630 will be further condensed to produce a resultant higher-quality optical carrier.

Figures 7A, 7B:
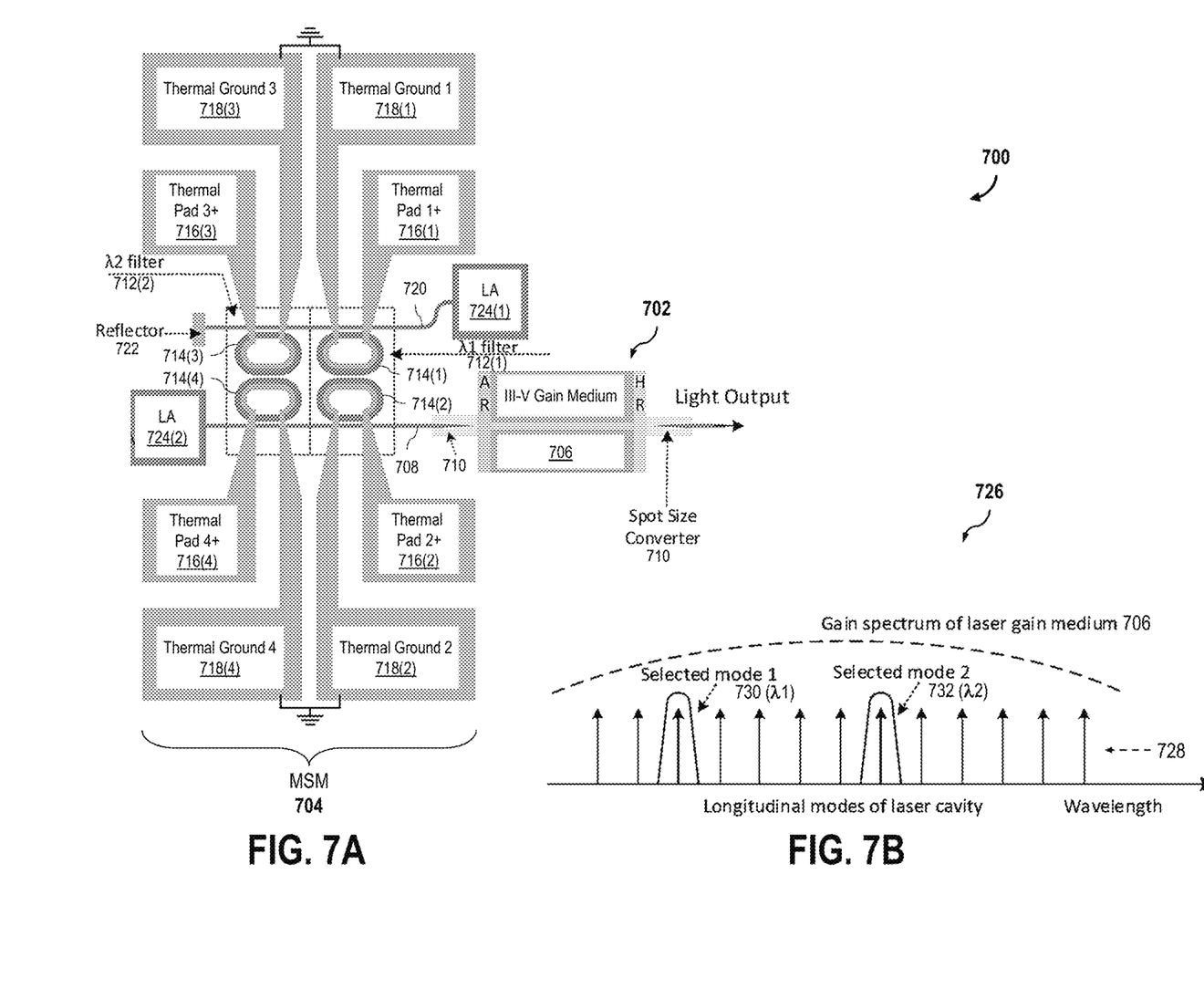
FIG. 7A depicts an exemplary dual-wavelength laser architecture, in accordance with an embodiment.
FIG. 7B depicts an exemplary operational principle of the dual-wavelength laser architecture depicted in FIG. 7A.

FIG. 7A depicts an exemplary DW laser architecture 700. In an exemplary embodiment, DW laser architecture 700 is similar to single-wavelength laser architecture 600, FIG. 6A, except that DW laser architecture 700 is configured for selection of two different wavelengths, $\lambda 1$ and $\lambda 2$, instead of the single-wavelength configuration illustrated above with respect to FIG. 6A. Accordingly, unless described to the contrary, respective components of DW laser architecture 700 having the same labels as components of single-wavelength laser architecture 600 may considered to conform to a substantially similar construction and functionality as the components described with respect to architecture 600.

Accordingly, in an exemplary embodiment DW laser architecture 700 similarly includes a laser 702 (e.g., an ECL) functionally integrated with a wavelength-selective optical MSM 704 that employs the MRR-based optical filtering techniques described above with respect to FIGS. 4-5. Laser 702 may further include a gain medium region 706 in the laser cavity thereof (e.g., III-V compound semiconductors), a rear facet having an AR coating and coupled with a first silicon waveguide 708, a front facet having a layer of HR coating, and one or more SSCs 710 disposed respectively at the front and rear facets. Similar to architecture 600, FIG. 6A, first silicon waveguide 708 may further couple with MSM 704 at an end (e.g., an add port) of first silicon waveguide 708 opposing the rear facet of laser/ECL 702.

MSM 704 further includes a pair of photonic filters 712 (dotted boxes in FIG. 7A) having one or more silicon-based MRRs 714. For ease of comparison with single-wavelength architecture 600, each photonic filter 712 of DW laser architecture 700 is also illustrated as including two silicon MRRs 714 (i.e., N=2) in a direction perpendicular to first silicon waveguide 708. Each MRR 714 includes a respective thermal pad 716 having a respective thermal ground 718. In an exemplary embodiment, MSM 704 further includes a second silicon waveguide 720 parallel to first silicon waveguide 708, an optical reflector 722 (e.g., at an input port), and first and second light absorbers 724 (e.g., at a through port and an add port, respectively.

Accordingly, it may be seen that the general configuration of DW laser architecture 700 conforms to and builds upon the innovative on-chip ECL principles described above with respect to single-wavelength laser architecture 600, FIG. 6A. That is, the fundamental operational principles DW laser architecture 700 are the same as those of single-wavelength architecture 600, except that DW laser architecture 700 adds a second MRR-based optical filter (e.g., photonic filter 712(2)) to enable selection of a second wavelength for amplification and oscillation by the same laser/ECL 702, in addition to the first wavelength selected using first MRR-based photonic filter 712(1). That is, the respective separated thermal pads 716 for each photonic filter 712 (e.g., separated thermal pads 716(1), 716(2) for first photonic filter 712(1), and separated thermal pads 716(3), 716(4) for second photonic filter 712(2)) advantageously enable the independent control of the particular wavelength selected (e.g., $\lambda 1$ and $\lambda 2$) for each mode.

FIG. 7B depicts an exemplary operational principle 726 of DW laser architecture 700, FIG. 7A. In an exemplary embodiment, operational principle 726 of the DW laser configuration is substantially similar to operational principle 626, FIG. 6B, of the single-wavelength laser configuration, except that in this DW laser configuration, the two MRR-based photonic filters 712(1), 712(2) enable MSM 704 to advantageously select, from a series of equally spaced longitudinal modes 728, two particular longitudinal modes instead of only one, namely, a first particular longitudinal mode 730 and a second particular longitudinal mode 732 having wavelengths centered at $\lambda 1$ and $\lambda 2$, respectively. According to DW laser architecture 700, both of first and second particular modes 730, 732 may be advantageously stimulated and amplified simultaneously by laser 702, while all other non-selected longitudinal modes 728 are suppressed.

The two lasers generated according to this integrated DW-ECL embodiment thus share the same gain medium (e.g., gain medium region 706) and laser cavity, and therefore the implementation of this DW-ECL configuration is not considered to significantly increase the overall complexity of the device/system when compared with the single-wavelength ECL configuration described above with respect to FIGS. 6A-B. Thus, the innovative principles described herein demonstrate how to scale single-wavelength ECL devices into MW-ECL devices (described further below with respect to FIG. 8) without incurring a commensurate increase in the complexity, and therefore the cost and footprint, of the scaled device. The present systems and methods therefore provide a cost-effective solution to conventional transceivers requiring two independent lasers.

Figure 8:
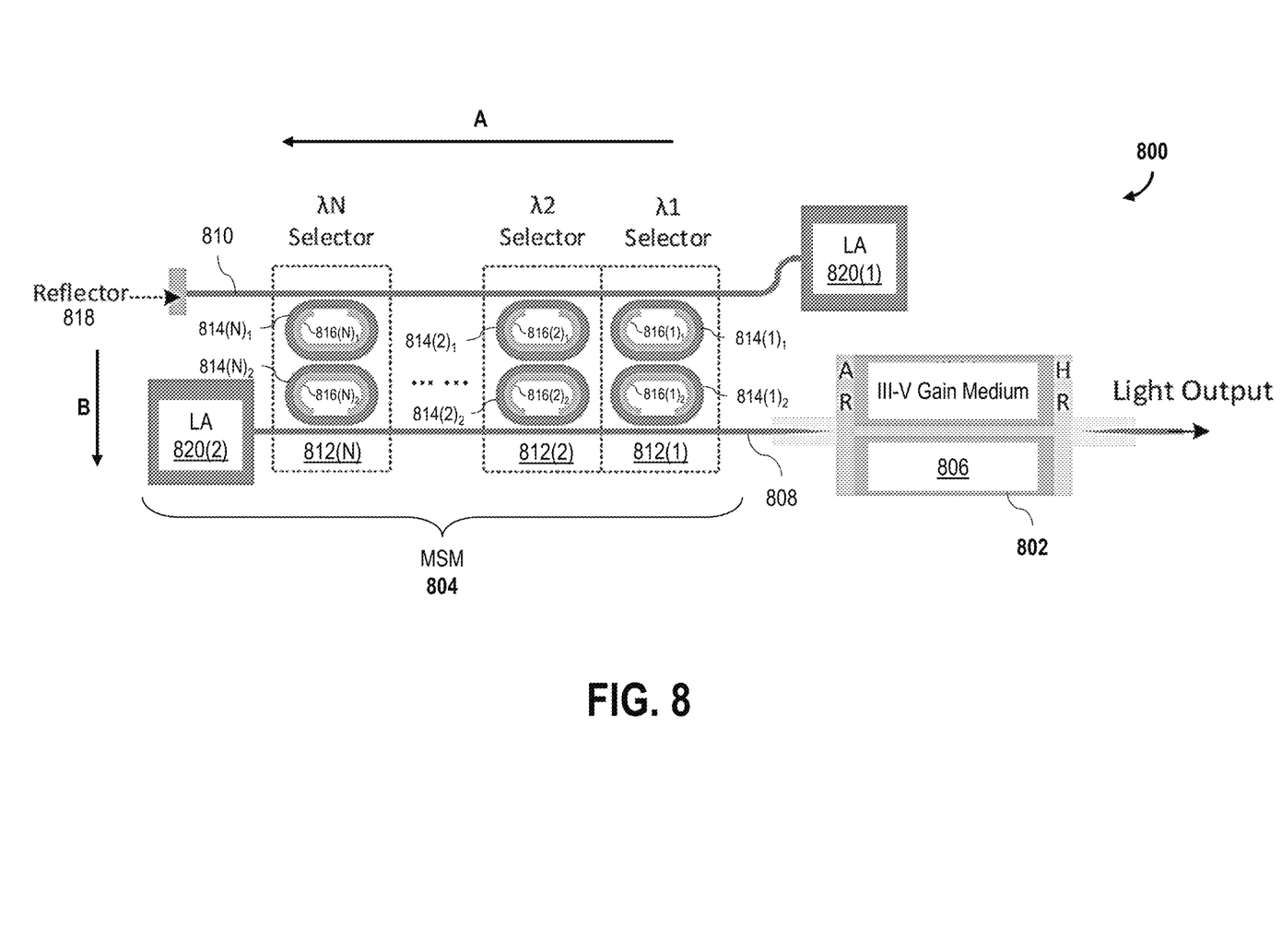
FIG. 8 depicts an exemplary multiple-wavelength laser architecture, in accordance with an embodiment.

FIG. 8 depicts an exemplary MW laser architecture 800. In an exemplary embodiment, MW laser architecture 800 is similar to DW laser architecture 700, FIG. 7A, except that MW laser architecture 700 is configured more generally, for selection of a plurality of different wavelengths, $\lambda 1, \lambda 2, \ldots \lambda N$, and is not limited to the selection of only two wavelengths (e.g., DW laser architecture 700, FIG. 7A), or even the selection of only a single wavelength (e.g., single-wavelength architecture 600, FIG. 6A). Accordingly, unless described to the contrary, respective components of MW laser architecture 800 having the same labels as components of DW laser architecture 700 may be considered to conform to a substantially similar construction and functionality as the components described with respect to DW laser architecture 700.

Accordingly, in an exemplary embodiment MW laser architecture 800 similarly includes a laser 802 (e.g., an ECL) functionally integrated with a wavelength-selective optical MSM 804 that employs the MRR-based optical filtering techniques described above. Laser 802 may further include a gain medium region 806 in the laser cavity thereof (e.g., III-V compound semiconductors), first and second parallel silicon waveguides 808, 810, a rear facet having an AR coating and coupled with first silicon waveguide 808, and a front facet having an HR coating. Similar to DW laser architecture 700, FIG. 7A, first silicon waveguide 808 may further couple with MSM 704 at an end (e.g., an add port) of first silicon waveguide 708 opposing the rear facet of laser/ECL 802.

MSM 804 further includes a series (i.e., 1-N) of photonic filters 812 (dotted boxes in FIG. 8), with each respective photonic filter 812 having one or more silicon-based MRRs 814 (two each of such MRR/rings 814, in this example, for ease of comparison with single-wavelength laser architecture 600, FIG. 6A, and with DW laser architecture, FIG. 7A, i.e., N=2 for each serial photonic filter 812) between parallel first and second silicon waveguides 808, 810, and cascaded from one silicon waveguide 808 or 810 to the other. Each MRR 814 includes a respective thermal pad 816 having a respective thermal ground 718. In an exemplary embodiment, MSM 804 further includes an optical reflector 818 (e.g., at an input port), and first and second light absorbers 820 (e.g., at a through port and an add port, respectively).

The person of ordinary skill in the art will understand that other components disclosed with respect to the previous embodiments, but shown again in the schematic illustration of FIG. 8, should not be considered from the MW-ECL embodiment. For example, more or fewer components may be included with respect to MW laser architecture 800 without departing from the scope herein.

Accordingly, MW laser architecture further demonstrates how the innovative concept of a mode-selective MSM (e.g., MSM 804) may be further easily scaled to generate an even greater number than two wavelengths from a single ECL laser device (e.g., laser 802) having a commonly shared gain medium and laser cavity, and without a significant increase in the complexity or cost of the MW device that is commensurate with the increase in capability achieved thereby. As illustrated in the exemplary embodiment depicted in FIG. 8, by cascading multiple photonic filters 812 for MSM 804, more than two longitudinal modes may be selected and reflected to the laser cavity according to the same operational principles described above, and limited only to the number of serial longitudinal modes generated from the laser cavity, as well as the individual quality or strength of each such longitudinal mode.

It should be noted that any reference to the plurality of photonic filters being "cascaded" refers to the sequential disposal of the respective photonic filters 812 in the direction A as a series of filters sequentially disposed in the direction of, and with each such filter sharing, both of first and second parallel silicon waveguides 808 and 810. This cascade of photonic filters 812 should not be confused with the cascade of MRR/rings 814 within each photonic filter 812, which rings are cascaded from one silicon waveguide 808 or 810 to the other silicon waveguide in the direction B, which is oriented perpendicular to direction A. It is further worth noting that an increase to the number of photonic filters 812, or even of MSMs 804, will give rise to higher insertion loss results, which would thus in turn further reduce the output power of an MW laser architecture.

Even considering such higher insertion losses and the resultant output power reduction therefrom, an MW laser according to the present embodiments may be of particular usefulness as a light source for WDM systems employing a number of different individual lasers. According to the embodiment illustrated in FIG. 8 though, comparable high-quality laser signals may be produced according to exemplary MW laser architecture 800, but through implementation of a single laser device to generate the multiple high-quality laser signals at a significantly reduced cost in comparison to conventional techniques.

The above embodiments and the present disclosure, demonstrate proven cost-saving solutions to the known challenges and tradeoffs arising from conventional solutions for the design of integrated bi-directional single-fiber coherent optical transceivers, including but not limited to configuration requiring two independent lasers and wavelength diplexer, and also that of an optical circulator-based FDCO. The present inventors have confronted and solved each of these known challenges by providing an innovative dual-wavelength, external cavity laser based on hybrid silicon photonics.

In exemplary embodiments, the novel DW-ECL laser may be made from III-V semiconductor compounds for the gain region thereof, which is then integrated with silicon-based wavelength selective mode-selective mirror, which functions to select and amplify two of the longitudinal modes (i.e., for the DW-ECL embodiment) generated in the laser cavity. In combination with additional low-cost integrated wavelength diplexers, the present embodiments provide a cost-effective solution that is particularly valuable for realizing wavelength division duplexed (WDD) coherent optical links over a single fiber.

The present systems and methods though, are not limited to only such applications. The general principles introduced herein for a laser integrated with a mode selective device (e.g., an MSM) are of immediate value for non-coherent optical links employing multiple lasers, or even to such conventional devices that produce a module having a single-wavelength laser on-chip. As described above with respect to FIGS. 3 and 6A, the innovative principles of the present embodiments may nevertheless be implemented to produce higher-quality single-wavelength optical transceiver modules, but at a reduced cost, complexity, and footprint.

According to the systems and methods described herein, innovative integrated lasers having scalable mode selection capability are provided as a lower-footprint and cost saving solution to challenges plaguing conventional optical transceiver modules. The present embodiments may further be advantageously readily incorporated, in a complementary fashion, into newer or conventional transceiver modules using existing ECL laser designs, and without significantly altering or complicating the general design considerations of conventional optical transceivers, coherent transceivers, or FDCO modules.

The present embodiments are still further advantageous in comparison with conventional techniques, in that the present systems and methods may be implemented as standalone transceiver devices or FDCO modules, or individual new components described herein may be directly implemented into a number of conventional devices and system, to immediately improve the performance thereof.

Exemplary embodiments of coherent optical systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments herein may be implemented and utilized in connection with other signal processing and signal recovery algorithms or techniques.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general-purpose central processing unit (CPU), a graphics processing unit (GPU), a microcontroller, a reduced instruction set computer (RISC) processor, an application specific integrated circuit (ASIC), a programmable logic circuit/controller (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A transceiver for a communication network, comprising:
 a single laser source including a single-wavelength external cavity laser (ECL) integrated with a wavelength-selective optical mode selective mirror (MSM), and configured to output (i) a first optical laser signal at a first wavelength, and (ii) a second optical laser signal at a second wavelength different from the first wavelength;
 a coherent transmitting portion configured to modulate the first optical laser signal for transmission to the communication network; and
 a coherent receiving portion configured to utilize the second optical laser signal as a local oscillator (LO) source.

2. The transceiver of claim 1, further comprising a first wavelength diplexer disposed proximate an output of the single laser source and configured to split the first optical laser signal from the second optical laser signal.

3. The transceiver of claim 2, wherein the first wavelength diplexer is further configured to (i) route the first optical laser signal to an input of the transmitting portion, and (ii) route the second optical laser signal to an input of the receiving portion.

4. The transceiver of claim 2, further comprising a second wavelength diplexer disposed between the communication network and the transceiver and configured to combine the first and second wavelengths for aggregated transmission over the communication network.

5. The transceiver of claim 1, wherein the ECL includes a laser cavity and a gain medium disposed between front and rear facets of the ECL, and wherein the MSM is coupled with the ECL rear facet.

6. The transceiver of claim 5, wherein the ECL is a hybrid ECL integrated with a type III-V gain chip.

7. The transceiver of claim 5, wherein the gain medium of the ECL is configured to generate a gain spectrum including a plurality of equally spaced longitudinal modes.

8. The transceiver of claim 7, wherein the MSM is coupled with the rear facet by a first silicon waveguide.

9. The transceiver of claim 8, further comprising a spot size converter (SSC) disposed proximate the rear facet for providing an optical mode conversion region from the first silicon waveguide to gain medium.

10. The transceiver of claim 7, wherein the MSM includes (i) a second silicon waveguide disposed substantially parallel to the first silicon waveguide, (ii) a first photonic filter disposed between the substantially parallel first and second silicon waveguides, and (iii) a second photonic filter disposed between the substantially parallel first and second silicon waveguides adjacent the first photonic filter.

11. The transceiver of claim 10, wherein the first photonic filter is configured to select a first mode from the plurality of longitudinal modes corresponding to the first wavelength, and wherein the second photonic filter is configured to select a second mode from the plurality of longitudinal modes corresponding to the first wavelength.

12. The transceiver of claim 11, wherein the MSM is further configured to (i) enable the ECL to stimulate and amplify the selected first and second modes into the first and second optical laser signals, respectively, and (ii) suppress other longitudinal modes from the plurality of longitudinal modes.

13. The transceiver of claim 12, wherein the first and second optical laser signals share the gain medium and laser cavity of the ECL.

14. The transceiver of claim 11, wherein the first photonic filter includes a first micro-ring resonator (MRR) disposed between the parallel first and second silicon waveguides.

15. The transceiver of claim 14, wherein the first MRR comprises a silicon-based construction.

16. The transceiver of claim 15, wherein the first MRR includes a first thermal pad configured to enable temperature control of the first MRR.

17. The transceiver of claim 16, wherein the first thermal pad includes a first thermal ground, and wherein the temperature control of the first MRR enables adjustment of the refractive index of the first MRR.

18. The transceiver of claim 14, wherein the first photonic filter includes a second MRR disposed between the first MRR and the second silicon waveguide.

19. The transceiver of claim 10, wherein the first silicon waveguide includes an add port and a drop port, wherein the second silicon waveguide includes an input port and a through port, and wherein the first and second photonic filters are disposed between (i) the add port and the drop port of the first silicon waveguide, and (ii) the input port and the through port of the second silicon waveguide.

20. The transceiver of claim 19, wherein the ECL is coupled with the drop port, and wherein the MSM further includes an optical reflector disposed at the input port, a first light absorber disposed at the through port, and a second light absorber disposed at the add port.

* * * * *